(No Model.)

O. H. SMITH.
WATER COOLER AND FILTER.

No. 494,901. Patented Apr. 4, 1893.

Witnesses:
R. Schleicher.
P. H. Goodwin.

Inventor:
Oliver H. Smith
by his Attorneys
Howson & Howson

UNITED STATES PATENT OFFICE.

OLIVER H. SMITH, OF FLEMINGTON, NEW JERSEY.

WATER COOLER AND FILTER.

SPECIFICATION forming part of Letters Patent No. 494,901, dated April 4, 1893.

Application filed July 8, 1892. Serial No. 439,331. (No model.)

*To all whom it may concern:*

Be it known that I, OLIVER H. SMITH, a citizen of the United States, and a resident of Flemington, Hunterdon county, New Jersey, have invented certain Improvements in a Combined Water Cooler and Filter, of which the following is a specification.

One object of my invention is to so construct a water cooler and filter as to provide for the convenient application of pressure to the water in the filter chamber in order to hasten the filtering operation, a further object being to provide for the effective cooling of the filtered water without waste of ice, and to use the ice with the best cooling effect until it is exhausted. These objects I attain in the manner hereinafter set forth, reference being had to the accompanying drawings, in which—

Figure 2:
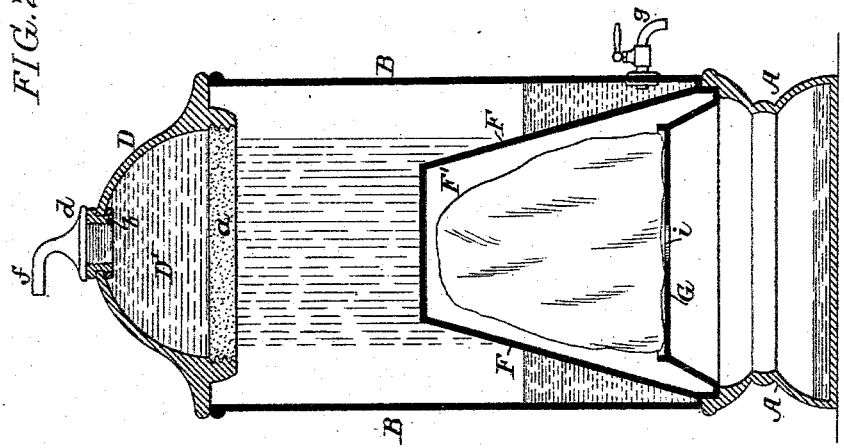
Figure 1:
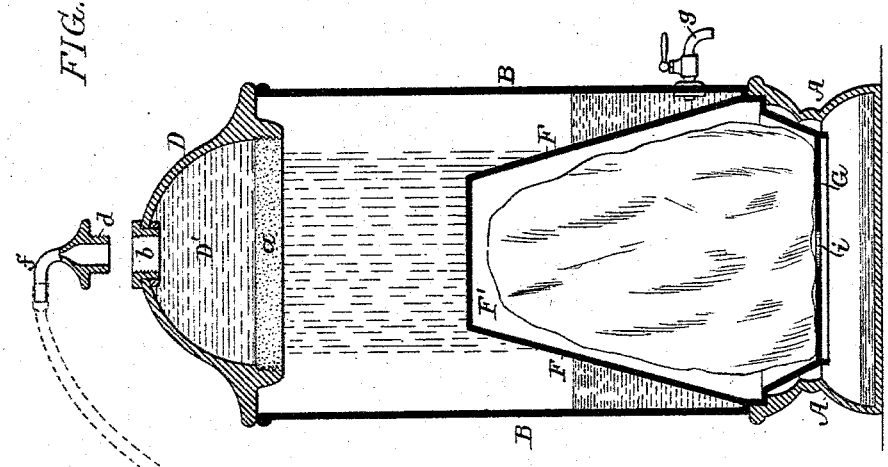

Figure 1, is a sectional view of a water cooler and filter constructed in accordance with my invention; and Fig. 2, is a similar view showing one of the parts in a different position.

A represents the base, B the body, and D the filtering cap or cover of the water cooler, these parts being detachable from one another so as to provide for ready access to the interior of the base and body of the cooler. The filtering cap D contains a filter chamber D' which is closed at the bottom by the filtering slab or block *a*, secured to the lower portion of the cap in any suitable manner, for instance by screwing it into a threaded opening at the base of the cap so that it can be readily removed when desired for cleansing purposes, or for permitting access to the filter chamber.

In the upper portion of the filtering cap D is an opening to which is adapted an internally threaded ring *b* clamped to the shell of the cap by a nut *b'*. Into this ring is screwed a hollow plug *d* with nozzle *f* to which can be attached one end of a flexible tube such as shown by dotted lines in Fig. 1, the other end of said tube being attached to a faucet communicating with a supply of water under pressure so that the water to be filtered can be conveyed to the filtering cap of the cooler and can be maintained under pressure in the filtering chamber D' so as to facilitate the filtering operation, the block *a* being capable of filtering the water much faster than it can flow through the same when subjected to such pressure. The nozzle for the reception of the flexible supply tube might be formed directly on the filtering cap or cover of the cooler if desired, but the use of the detachable screw plug with the nozzle is preferred.

Extending upward from the body B of the cooler is a casing F in the form of a truncated cone onto which the water falls after passing through the filtering block *a*, the water accumulating in the annular chamber between the casing F and the body B of the cooler from which chamber it is withdrawn as required through the usual faucet *g*.

The chamber F' within the casing F is the ice chamber, the block of ice being mounted upon a dish G which has a flange supported upon a suitable ledge or shoulder in the base A. When the lump of ice is large this dish is adjusted to the position shown in Fig. 1 so that the ice rests in the depressed portion of the dish below the supporting shoulder, but as the ice melts away the dish is reversed as shown in Fig. 2 and the lump of ice is supported upon the inverted bottom of the dish at a point above the supporting shoulder in the base, the object of this construction being to keep the ice at all times as close as possible to the casing F so as to impart to the latter the desired low temperature for cooling the filtered water contained in the annular space surrounding said casing. The dish G has in the bottom an opening *i* so that the water due to the melting of the ice is collected in the lower portion of the hollow base A from which it may be withdrawn when desired.

The body B and casing F of the cooler can, if desired, be formed in one piece or they may be in separate pieces provided they are united at their bases by a water-tight joint.

By protecting the ice from contact with the water in the manner described I am enabled to cool the water to an acceptable temperature without that rapid melting of the ice which inevitably occurs when the water is in direct contact with the ice, and besides this saving the water is much more palatable than when its temperature is excessively low or approaches the temperature of the ice itself. The filtering block *a* should equal or exceed in area the top of the casing F so that the fine streams of water descending from the filtering block will be distributed over the entire area of the upper part of said casing, and will thus be more readily cooled than if concentrated in one spot.

Having thus described my invention, I claim and desire to secure by Letters Patent—

1. A water cooler having a filtering cap closed at the bottom by a filter block, and having at the top a threaded ring clamped by means of a nut to the shell of the cap, and a nozzle screwed into said threaded ring, substantially as specified.

2. A water cooler having a filtering cap provided at the top with a nozzle for receiving the water supply, and closed at the bottom by means of an externally threaded filter block screwed into said cap, substantially as specified.

3. A water cooler having a body with internal casing open at the bottom and forming an ice chamber, a hollow base detachable from the body, and an ice supporting plate or dish with drainage opening therein, substantially as specified.

4. A water cooler having a body with internal casing open at the bottom and inclosing an ice chamber, a base and a reversible dish supported in said base so as to maintain the ice at different elevations in the ice chamber, substantially as specified.

5. A combined water cooler and filter consisting of the body having an internal casing open at the bottom for the reception of the ice, means for supporting the ice in the chamber within said casing, and a filter cap having a filter block directly above the casing and equaling or exceeding in area the top of said casing, whereby the water passing from said filter block is distributed in fine streams over the entire area of the upper part of the casing, substantially as specified.

In testimony whereof I have signed my name to this specification in the presence of two subscribing witnesses.

OLIVER H. SMITH.

Witnesses:
GEO. M. THORNTON,
ANDREW T. CONNET.